United States Patent
Adusumalli et al.

(10) Patent No.: US 11,281,209 B2
(45) Date of Patent: Mar. 22, 2022

(54) VEHICLE VISION SYSTEM

(71) Applicant: ZF FRIEDRICHSHAFEN AG, Friedrichshafen (DE)

(72) Inventors: Venkateswara Adusumalli, New Hudson, MI (US); Robert Berg, Ann Arbor, MI (US); Santanu Panja, Commerce Township, MI (US); James Oldiges, Farmington Hills, MI (US); Sriharsha Yeluri, Farmington Hills, MI (US); Radha Sivaraman, Troy, MI (US)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 97 days.

(21) Appl. No.: 16/720,099

(22) Filed: Dec. 19, 2019

(65) Prior Publication Data
US 2021/0191386 A1 Jun. 24, 2021

(51) Int. Cl.
| | |
|---|---|
| *G05D 1/00* | (2006.01) |
| *G06K 9/00* | (2006.01) |
| *G06K 9/32* | (2006.01) |
| *G07C 5/00* | (2006.01) |
| *B60J 1/17* | (2006.01) |

(52) U.S. Cl.
CPC ............ *G05D 1/005* (2013.01); *B60J 1/17* (2013.01); *G06K 9/00201* (2013.01); *G06K 9/00832* (2013.01); *G06K 9/3233* (2013.01); *G07C 5/008* (2013.01); *G05D 2201/0213* (2013.01)

(58) Field of Classification Search
CPC ... G05D 1/005; G05D 2201/0213; B60J 1/17; G07C 5/008; B60K 9/008; B60K 9/00201; B60K 9/3233
See application file for complete search history.

(56) References Cited

U.S. PATENT DOCUMENTS

| | | | |
|---|---|---|---|
| 6,625,315 B2 * | 9/2003 | Laumeyer | G06K 9/00818 358/538 |
| 6,792,339 B2 * | 9/2004 | Basson | G08B 13/19647 340/438 |
| 8,405,731 B2 | 3/2013 | Nilsson | |
| 9,205,835 B2 * | 12/2015 | Stein | G06K 9/00805 |
| 9,847,004 B1 * | 12/2017 | Lan | G08B 21/22 |
| 10,115,029 B1 * | 10/2018 | Day | G06K 9/00369 |
| 2009/0066065 A1 | 3/2009 | Breed et al. | |
| 2016/0272114 A1 | 9/2016 | Medina | |
| 2017/0240022 A1 | 8/2017 | Ireri | |
| 2018/0272977 A1 | 9/2018 | Szawarski et al. | |

(Continued)

FOREIGN PATENT DOCUMENTS

| | | |
|---|---|---|
| EP | 2164043 A1 | 3/2010 |
| WO | 2006099172 A1 | 9/2006 |

*Primary Examiner* — Michael J Zanelli
(74) *Attorney, Agent, or Firm* — Tarolli, Sundheim, Covell & Tummino LLP

(57) ABSTRACT

A method of processing live images from a vehicle camera includes acquiring live images and detecting an object within a first live image of the live images. The live images following the first live image are evaluated for object detection. A confidence level is adjusted in response to the object detection evaluation in each of the live images following the first live image. A final value of the confidence level in the object detection within the live images is established after the live images are evaluated.

31 Claims, 13 Drawing Sheets

(56) References Cited

U.S. PATENT DOCUMENTS

| | | | |
|---|---|---|---|
| 2019/0057596 A1* | 2/2019 | Desai | A45C 13/24 |
| 2019/0251818 A1* | 8/2019 | Nagatomi | G08G 1/20 |
| 2019/0303686 A1* | 10/2019 | Guo | G06K 9/3241 |
| 2021/0127204 A1* | 4/2021 | Porta | G06N 3/08 |

* cited by examiner

VEHICLE VISION SYSTEM

TECHNICAL FIELD

The present invention relates generally to vehicle assist systems, and specifically to a vision system for a vehicle interior.

BACKGROUND

Current driver assistance systems (ADAS—advanced driver assistance system) offer a series of monitoring functions in vehicles. In particular, the ADAS can monitor the environment within the vehicle and notify the driver of the vehicle of conditions therein. To this end, the ADAS can capture images of the vehicle interior and digitally process the images to extract information. The vehicle can perform one or more functions in response to the extracted information.

SUMMARY

In one example, a method of processing live images from a vehicle camera includes acquiring live images and detecting an object within a first live image of the live images. The live images following the first live image are evaluated for object detection. A confidence level is adjusted in response to the object detection evaluation in each of the live images following the first live image. A final value of the confidence level in the object detection within the live images is established after the live images are evaluated.

In another example, a method of processing live images from a vehicle camera includes acquiring live images of an interior of the vehicle. The live images are compared to an ideally aligned image of the vehicle interior having a region of interest to generate a homography matrix. The homography matrix is applied to the region of interest to generate a calibrated region of interest projected onto each of the lives images. At least one object is detected within the calibrated region of interest in a first live image of the live images. The calibrated region of interest in the live images following the first live image is evaluated for object detection. Each of the at least one detected objects has a confidence value associated therewith. Each confidence value is increased each time the associated object is detected in any of the live images following the first live image and is decreased each time the associated object is not detected in any of the live images following the first live image. A final value of the confidence level in the object detection within the live images is established for each detected object after the live images are evaluated.

Other objects and advantages and a fuller understanding of the invention will be had from the following detailed description and the accompanying drawings.

DETAILED DESCRIPTION

Figure 1A:
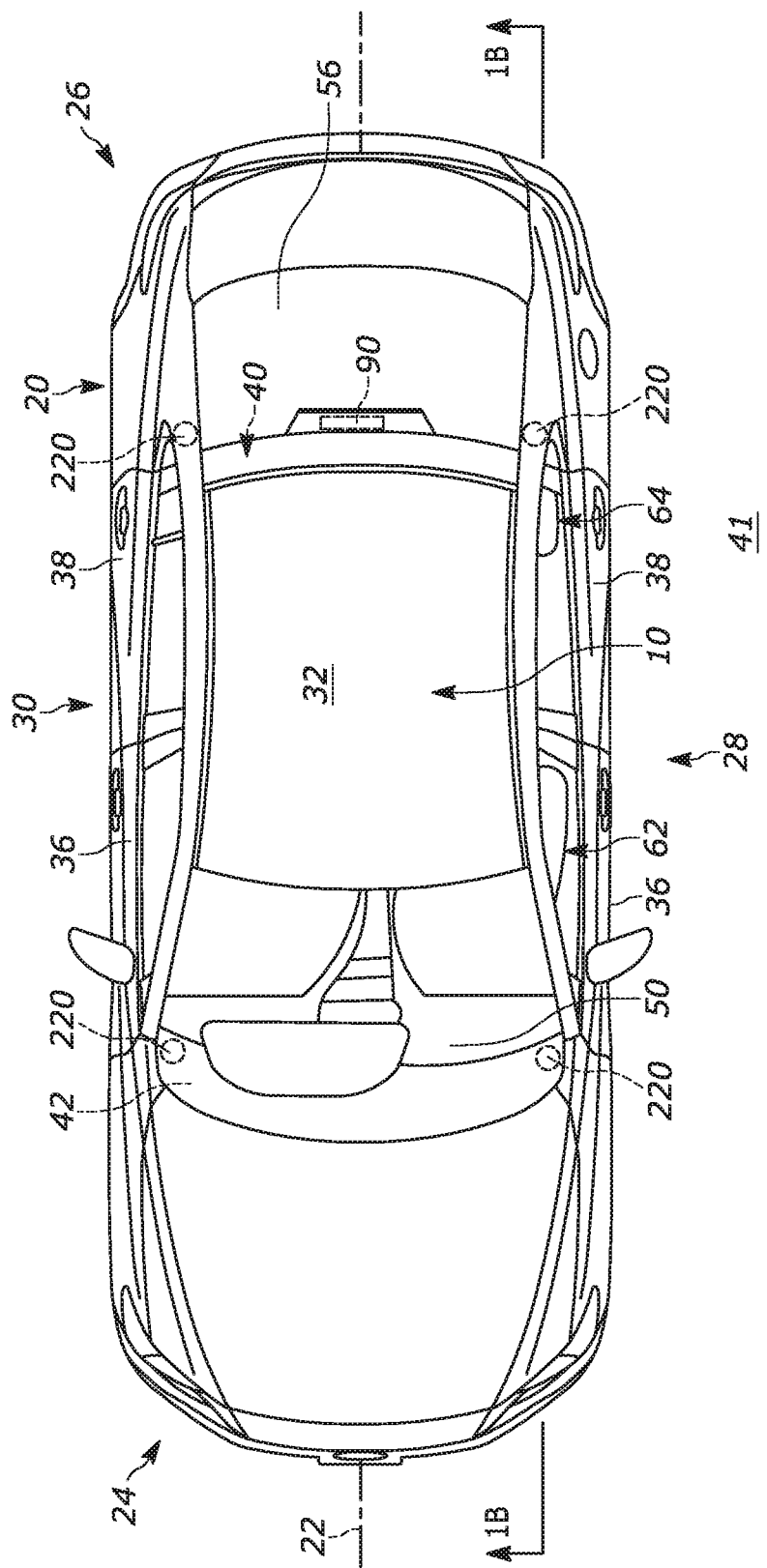
FIG. 1A is a top view of a vehicle including an example vision system in accordance with the present invention.
Figure 1B:
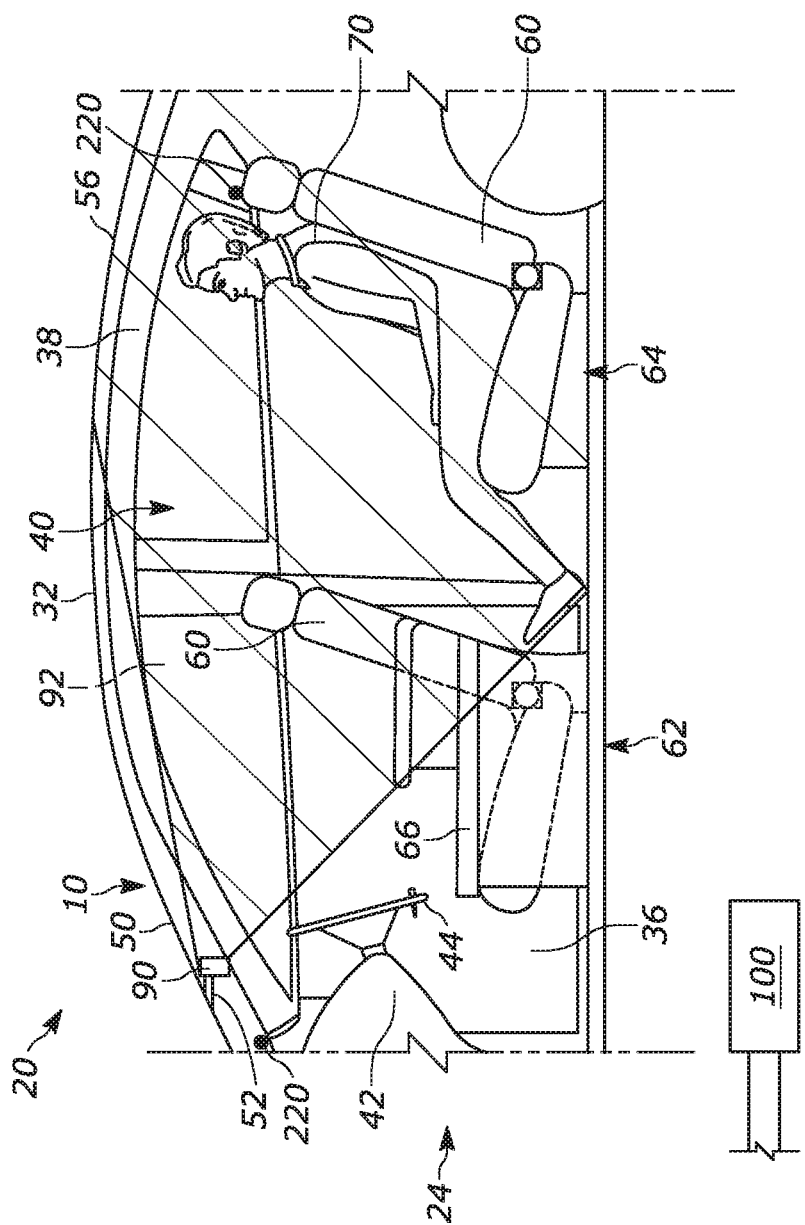
FIG. 1B is a section view taken along line 1B-1B of the vehicle of FIG. 1A.

The present invention relates generally to vehicle assist systems, and specifically to a vision system for a vehicle interior. FIGS. 1A-1B illustrate a vehicle 20 having an example vehicle assist system in the form of a vision system 10 for acquiring and processing images within the vehicle. The vehicle 20 extends along a centerline 22 from a first or front end 24 to a second or rear end 26. The vehicle 20 extends to a left side 28 and a right side 30 on opposite sides of the centerline 22. Front and rear doors 36, 38 are provided on both sides 28, 30. The vehicle 20 includes a roof 32 that cooperates with the front and rear doors 36, 38 on each side 28, 30 to define a passenger cabin or interior 40. An exterior of the vehicle 20 is indicated at 41.

The front end 24 of the vehicle 20 includes an instrument panel 42 facing the interior 40. A steering wheel 44 extends from the instrument panel 42. Alternatively, the steering wheel 44 can be omitted (not shown) if the vehicle 20 is an autonomous vehicle. Regardless, a windshield or windscreen 50 is located between the instrument panel 42 and the roof 32. A rear view mirror 52 is connected to the interior of the windshield 50. A rear window 56 at the rear end 26 of the vehicle 20 helps close the interior 40.

Seats 60 are positioned in the interior 40 for receiving one or more occupants 70. In one example, the seats 60 can be arranged in front and rear rows 62 and 64, respectively, oriented in a forward-facing manner. In an autonomous vehicle configuration (not shown), the front row 62 can be rearward facing. A center console 66 is positioned between the seats 60 in the front row 62.

The vision system 10 includes at least one camera 90 positioned within the vehicle 20 for acquiring images of the interior 40. As shown, a camera 90 is connected to the rear view mirror 52, although other locations, e.g., the roof 32, rear window 56, etc., are contemplated. In any case, the camera 90 has a field of view 92 extending rearward through the interior 40 over a large percentage thereof, e.g., the space between the doors 36, 38 and from the windshield 50 to the rear window 56. The camera 90 produces signals indicative of the images taken and sends the signals to a controller 100. It will be appreciated that the camera 90 can alternatively be mounted on the vehicle 20 such that the field of view 92 extends over or includes the vehicle exterior 41. The controller 100, in turn, processes the signals for future use.

Figure 2A:
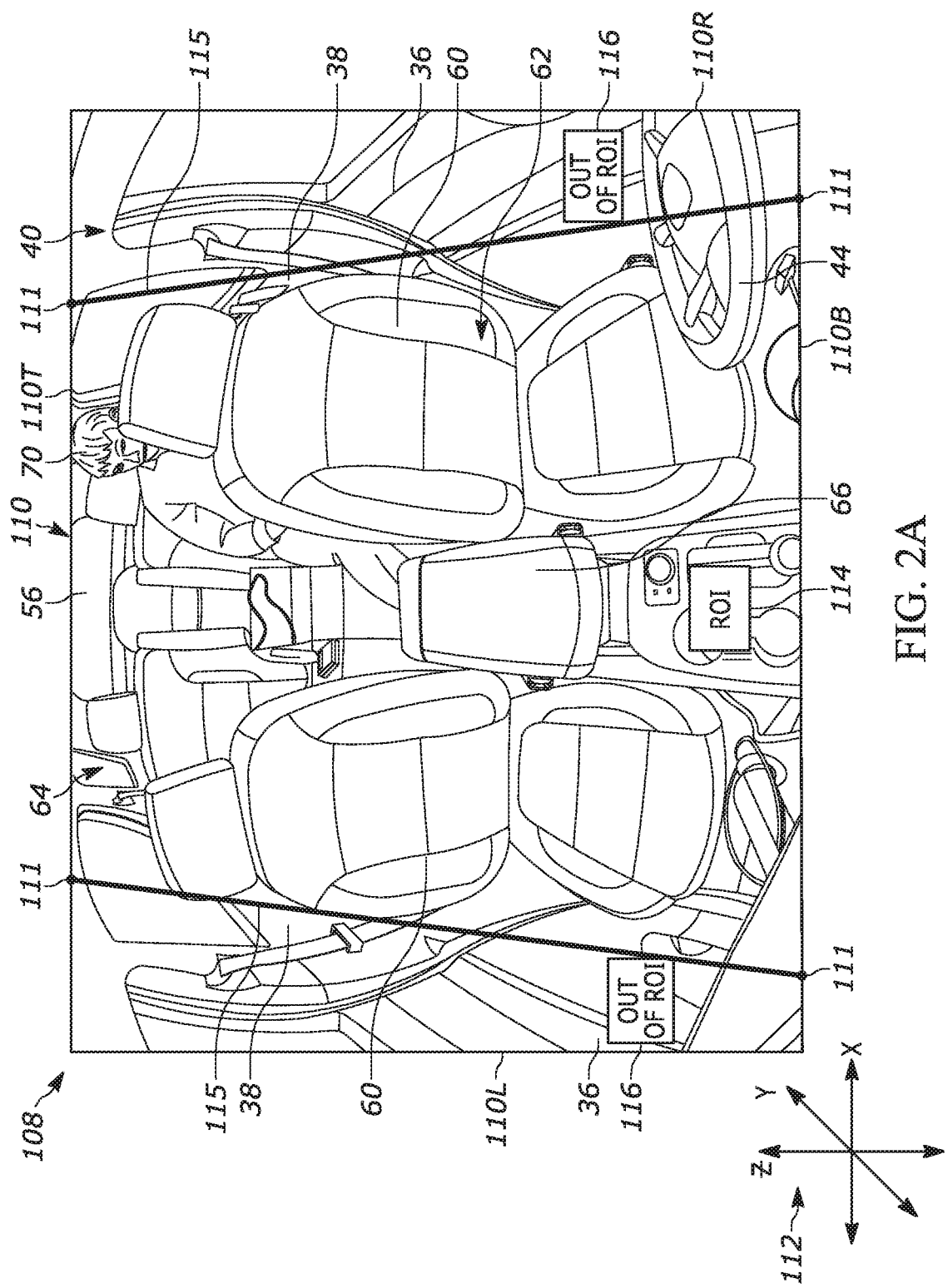
FIG. 2A is a schematic illustration of an ideally aligned image of the vehicle interior.

As shown in FIG. 2A, when the vehicle 20 is manufactured, a template or ideally aligned image 108 of the interior 40 is created for helping calibrate the camera 90 once the camera is installed and periodically thereafter. The ideally aligned image 108 reflects an ideal position of the camera 90 aligned with the interior 40 in a prescribed manner to produce a desired field of view 92. To this end, for each make and model of vehicle 20, the camera 90 is positioned such that its live images, i.e., images taken during vehicle use, most closely match the ideally aligned, desired orientation in the interior 40 including a desired location, depth, and boundary. The ideally aligned image 108 captures portions of the interior 40 where it is desirable to monitor/detect objects, e.g., seats 60, occupants 70, pets or personal effects, during operation of the vehicle 20.

The ideally aligned image 108 is defined by a boundary 110. The boundary 110 has a top boundary 110T, a bottom boundary 110B, and a pair of side boundaries 110L, 110R. That said, the boundary 110 shown is rectangular although other shapes for the boundary, e.g., triangular, circular, etc. are contemplated. Since the camera 90 faces rearward in the vehicle 20, the side boundary 110L is on the left side of the image 108 but the right side 30 of the vehicle 20. Similarly, the side boundary 110R on the right side of the image 108 is on the left side 28 of the vehicle 20. The ideally aligned image 108 is overlaid with a global coordinate system 112 having x-, y-, and z-axes.

The controller 100 can divide the ideally aligned image 108 into one or more regions of interest 114 (abbreviated "ROI" in the figures) and/or one or more regions of disinterest 116 (indicated at "out of ROI" in the figures). In the example shown, boundary lines 115 demarcate the region of interest 114 in the middle from the regions of disinterest 116 on either side thereof. The boundary lines 115 extend between bounding points 111 that, in this example, intersect the boundary 110. The region of interest 114 lies between the boundaries 110T, 110B, 115. The left (as viewed in FIG. 2A) region of disinterest 116 lies between the boundaries 110T, 110B, 110L, 115. The right region of disinterest 116 lies between the boundaries 110T, 110B, 110R, 115.

In the example shown in FIG. 2A, the region of interest 114 can be the area including the rows 62, 64 of seats 60. The region of interest 114 can coincide with areas of the interior 40 where it is logical that a particular object or objects would reside. For example, it is logical for occupants 70 to be positioned in the seats 60 in either row 62, 64 and, thus, the region of interest 114 shown extends generally to the lateral extent of the rows. In other words, the region of interest 114 shown is specifically sized and shaped for occupants 70—an occupant-specific region of interest as it were.

It will be appreciated that different objects of interest, e.g., pets, laptop, etc., can have a specifically sized and shaped region of interest that pre-defines where it is logical for that particular object to be located in the vehicle 20. These different regions of interest have predetermined, known locations within the ideally aligned image 108. The different regions of interest can overlap one another depending on the objects of interest associated with each region of interest.

Figure 2B:
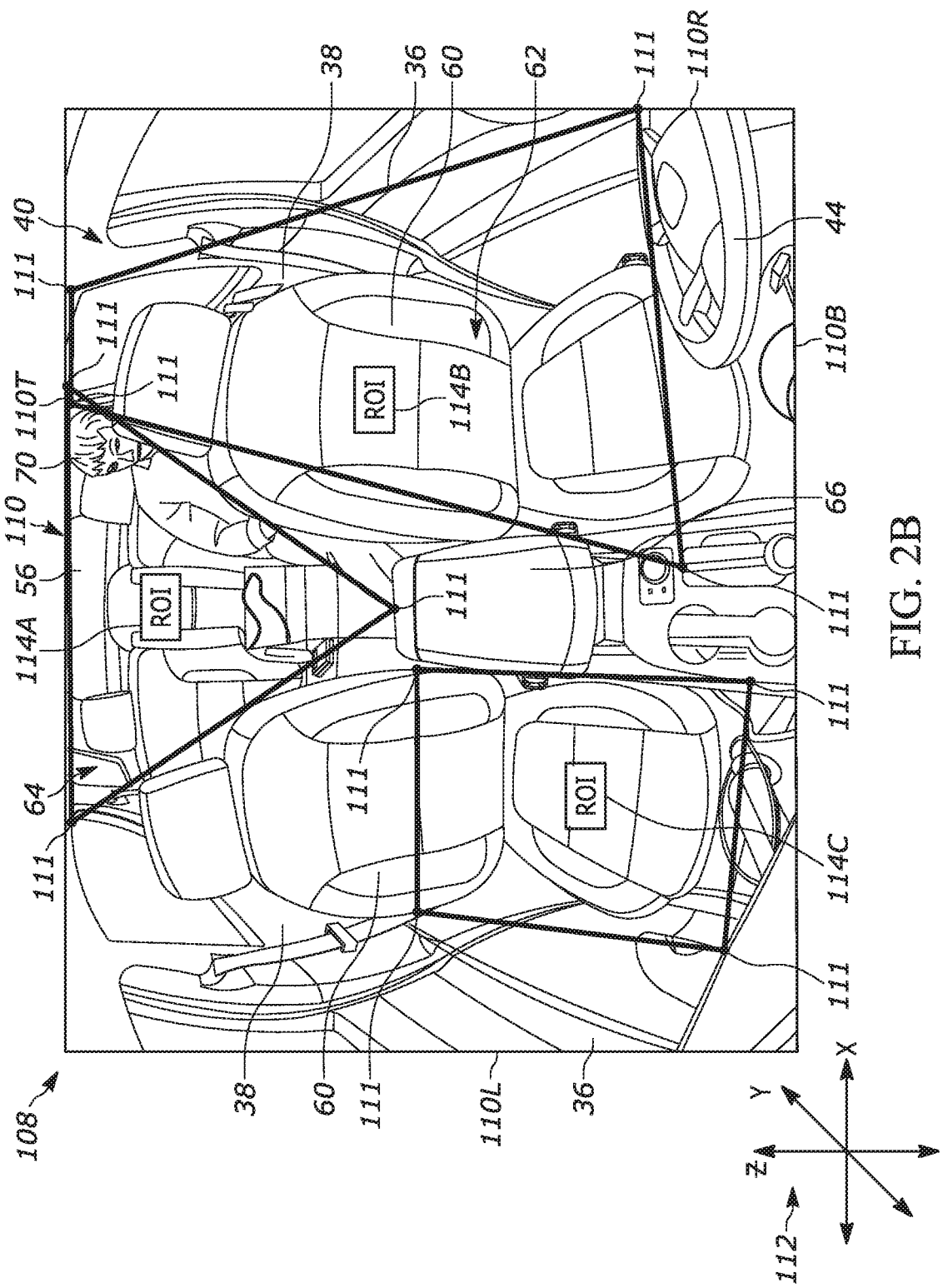
FIG. 2B is a schematic illustration of another example ideally aligned image.

With this in mind, FIG. 2B illustrates different regions of interest in the ideally aligned image 108 for different objects of interest, namely, the region of interest 114a is for a pet in the rear row 64, the region of interest 114b is for an occupant in the driver's seat 60, and the region of interest 114c is a for a laptop. Each region of interest 114a-114c is bound between associated bounding points 111. In each case, the region of interest 114-114c is the inverse of the region(s) of disinterest 116 such that collectively the regions form the entire ideally aligned image 108. In other words, everywhere in the ideally aligned image 108 not bound by the region of interest 114-114c is considered the region(s) of disinterest 116.

Returning to the example shown in FIG. 2A, the regions of disinterest 116 are the areas laterally outside the rows 62, 64 and adjacent the doors 36, 38. The regions of disinterest 116 coincide with areas of the interior 40 where it is illogical for the objects (here occupants 70) to reside. For example, it is illogical that an occupant 70 would be positioned on the interior of the roof 32.

Figure 3:
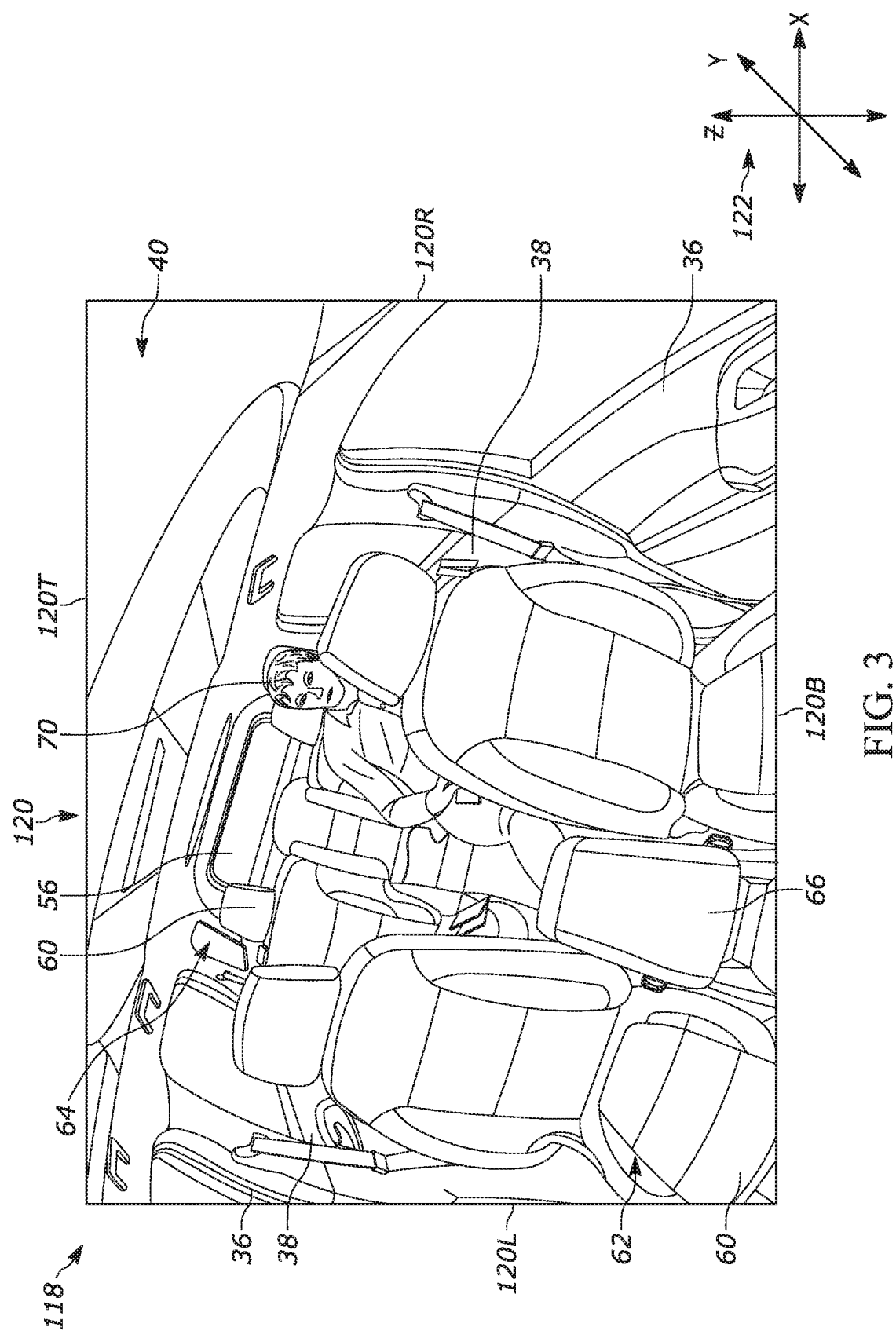
FIG. 3 is a schematic illustration of a live image of the vehicle interior.

During vehicle 20 operation, the camera 90 acquires images of the interior 40 and sends signals to the controller 100 indicative of the images. The controller 100, in response to the received signals, performs one or more operations to the image and then detects objects of interest in the interior 40. The images taken during vehicle 20 operation are referred to herein as "live images". An example live image 118 taken is shown in FIG. 3.

The live image 118 shown is defined by a boundary 120. The boundary 120 includes a top boundary 120T, a bottom boundary 120B, and a pair of side boundaries 120L, 120R. Since the camera 90 faces rearward in the vehicle 20, the side boundary 120L is on the left side of the live image 118 but the right side 30 of the vehicle 20. Similarly, the side boundary 120R on the right side of the live image 118 is on the left side 28 of the vehicle 20.

The live image 118 is overlaid or associated with a local coordinate system 122 having x-, y-, and z-axes from the perspective of the camera 90. That said, the live image 118 may indicate a deviation in position/orientation in the camera 90 compared to the position/orientation of the camera that generated the ideally aligned image 108 for several reasons. First, the camera 90 can be installed improperly or otherwise in an orientation that captures a field of view 92 deviating from the field of view generated by the camera taking the ideally aligned image 108. Second, the camera 90 position can be affected after installation due to vibration from, for example, road conditions and/or impacts to the rear view mirror 52. In any case, the coordinate systems 112, 122 may not be identical and, thus, it is desirable to calibrate the camera 90 to account for any differences in orientation between the position of the camera capturing the live images 118 and the ideal position of the camera capturing the ideally aligned image 108.

In one example, the controller 100 uses one or more image matching techniques, such as Oriented FAST and rotated BRIEF (ORB) feature detection, to generate keypoints in each image 108, 118. The controller 100 then generates a homography matrix from matching keypoint pairs and uses that homography matrix, along with known intrinsic camera 90 properties, to identify camera position/orientation deviations across eight degrees of freedom to help the controller 100 calibrate the camera. This allows the vision system to ultimately better detect objects within the live images 118 and make decisions in response thereto.

Figure 4:
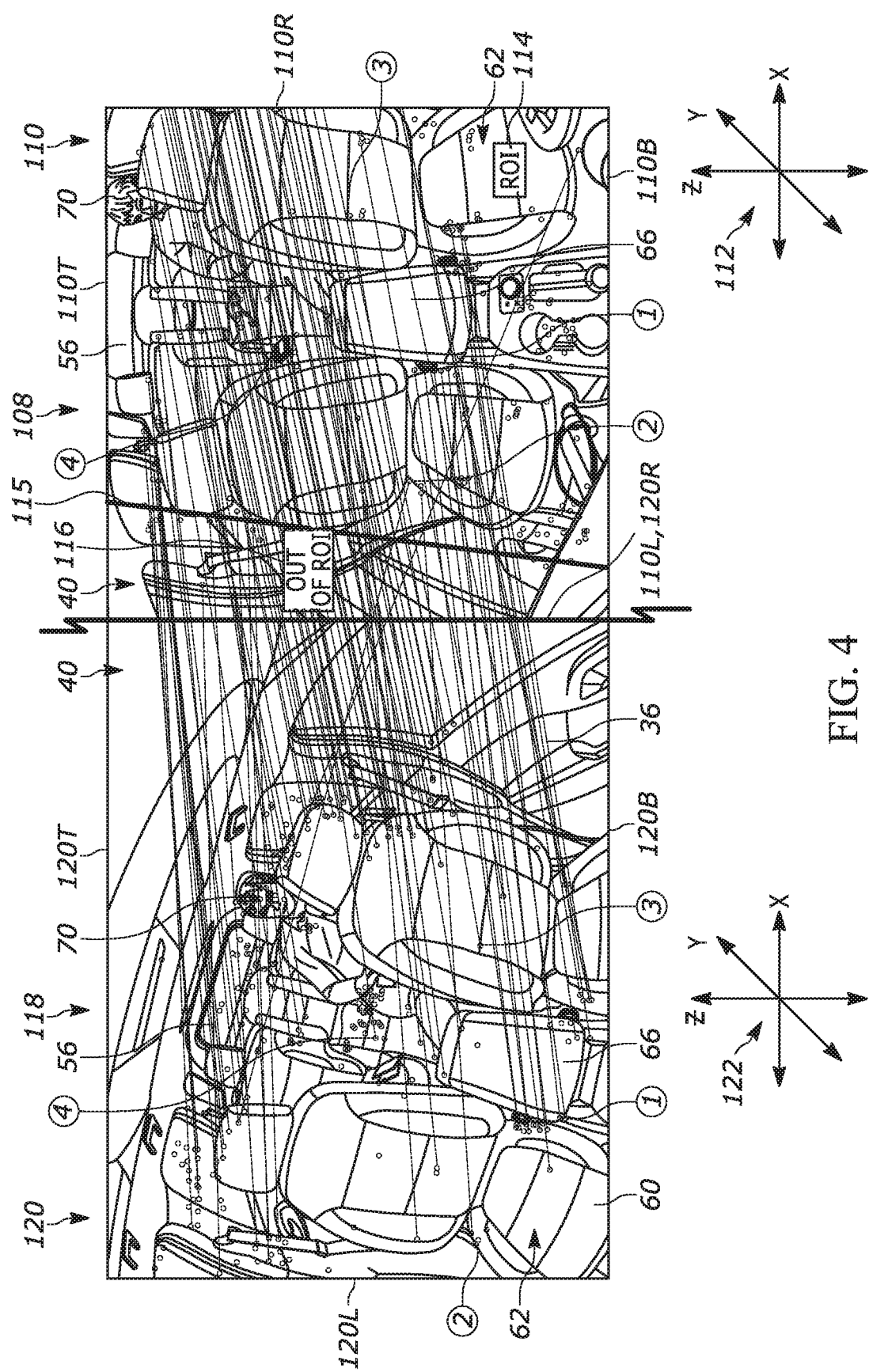
FIG. 4 is a comparison between the ideally aligned image and live image using generated keypoints.

One example implementation of this process is illustrated in FIG. 4. The ideally aligned image 108 and the live image 118 are placed adjacent one another for illustrative purposes. The controller 100 identifies keypoints—illustrated keypoints are indicated as ①, ②, ③, ④—within each image 108, 118. The keypoints are distinct locations in the images 108, 118 that are attempted to be matched with one another and correspond with the same exact point/location/spot in each image. The features can be, for example, corners, stitch lines, etc. Although only four keypoints are specifically identified it will be appreciated that the vision system 10 can rely on hundreds or thousands of keypoints.

In any case, the keypoints are identified and their locations mapped between image 108, 118. The controller 100 calculates the homography matrix based on the keypoint matches in the live image 118 against the ideally aligned image 108. With additional information of the intrinsic camera properties, the homography matrix is then decomposed to identify any translations (x, y, and z axis), rotations (yaw, pitch, and roll), and sheer and scale of the camera 90 capturing the live image 118 relative to the ideal camera capturing the ideally aligned image 108. The decomposition of the homography matrix therefore quantifies the misalignment between the camera 90 capturing the live image 118 and the ideal camera capturing the ideally aligned image 108 across eight degrees of freedom.

A misalignment threshold range can be associated with each degree of freedom. In one instance, the threshold range can be used to identify which live image 118 degree of freedom deviations are negligible and which are deemed large enough to warrant physical correction of the camera 90 position and/or orientation. In other words, deviations in one or more particular degrees of freedom between the images 108, 118 may be small enough to warrant being ignored—no correction of that degree of freedom occurs. The threshold range can be symmetric or asymmetric for each degree of freedom.

If, for example, the threshold range for rotation about the x-axis was +/−0.05°, a calculated x-axis rotation deviation in the live image 118 from the ideally aligned image 108 within the threshold range would not be taken into account in physically adjusting the camera 90. On the other hand, rotation deviations about the x-axis outside the corresponding threshold range would constitute a severe misalignment and require recalibration or physical repositioning of the camera 90. The threshold ranges therefore act as a pass/fail filter for deviations in each degree of freedom.

The homography matrix information can be stored in the controller 100 and used to calibrate any live image 118 taken by the camera 90, thereby allowing the vision system 10 to better react to said live images, e.g., better ascertain changes in the interior 40. To this end, the vision system 10 can use the homography matrix to transform the entire live image 118 and produce a calibrated or adjusted live image 119 shown in FIG. 5. When this occurs, the calibrated live image 119 can be rotated or skewed relative to the boundary 120 of the live image 118. The region of interest 114—via the bounding points 111—is then projected onto the calibrated live image 119. In other words, the un-calibrated region of interest 114 is projected onto the calibrated live image 119. This transformation of the live image 118, however, can involve extensive calculations by the controller 100.

Figure 6:
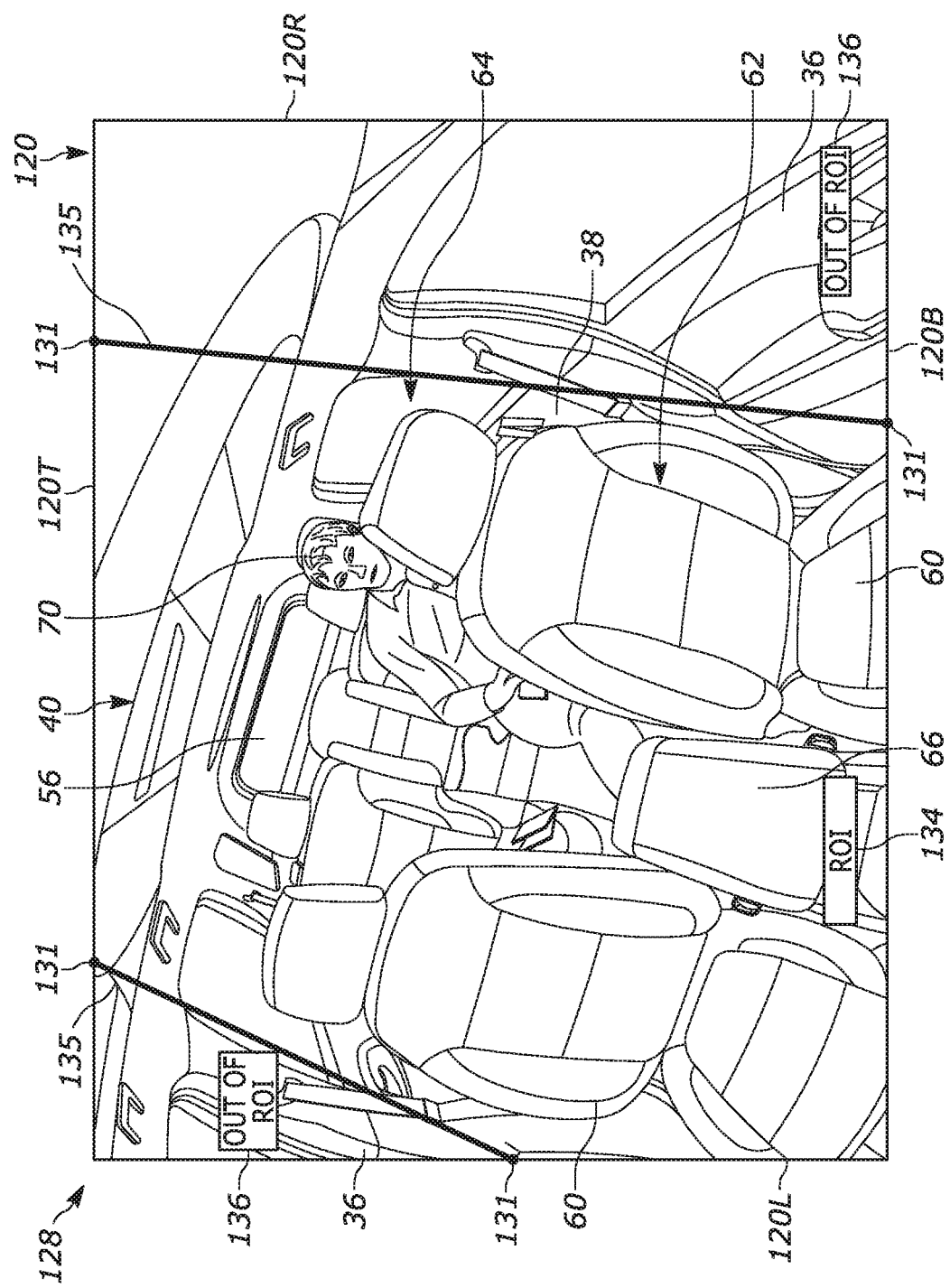
FIG. 6 is a schematic illustration of the live image with a calibrated region of interest.

That said, the controller 100 can alternatively transform or calibrate only the region of interest 114 and project the calibrated region of interest 134 onto the un-calibrated live image 118 to form a calibrated image 128 shown in FIG. 6. In other words, the region of interest 114 can be transformed via the translation, rotation, and/or sheer/scale data stored in the homography matrix and projected or mapped onto the untransformed live image 118 to form the calibrated image 128.

More specifically, the bounding points 111 of the region of interest 114 are calibrated with transformations using the generated homography matrix to produce corresponding bounding points 131 in the calibrated image 128. It will be appreciated, however, that one or more of the bounding points 131 could be located outside the boundary 120 when projected onto the live image 118, in which case the intersection of the lines connecting the bounding points with the boundary 120 help to define the calibrated region of interest 134 (not shown). Regardless, the newly calibrated region of interest 134 aligns on the live image 118 (in the calibrated image 128) as the original region of interest 114 aligns on the ideally aligned image 108. This calibration in effect fixes the region of interest 114 such that image transformations don't need to be applied to the entire live images 118, thereby reducing processing time and power required.

Figure 5:
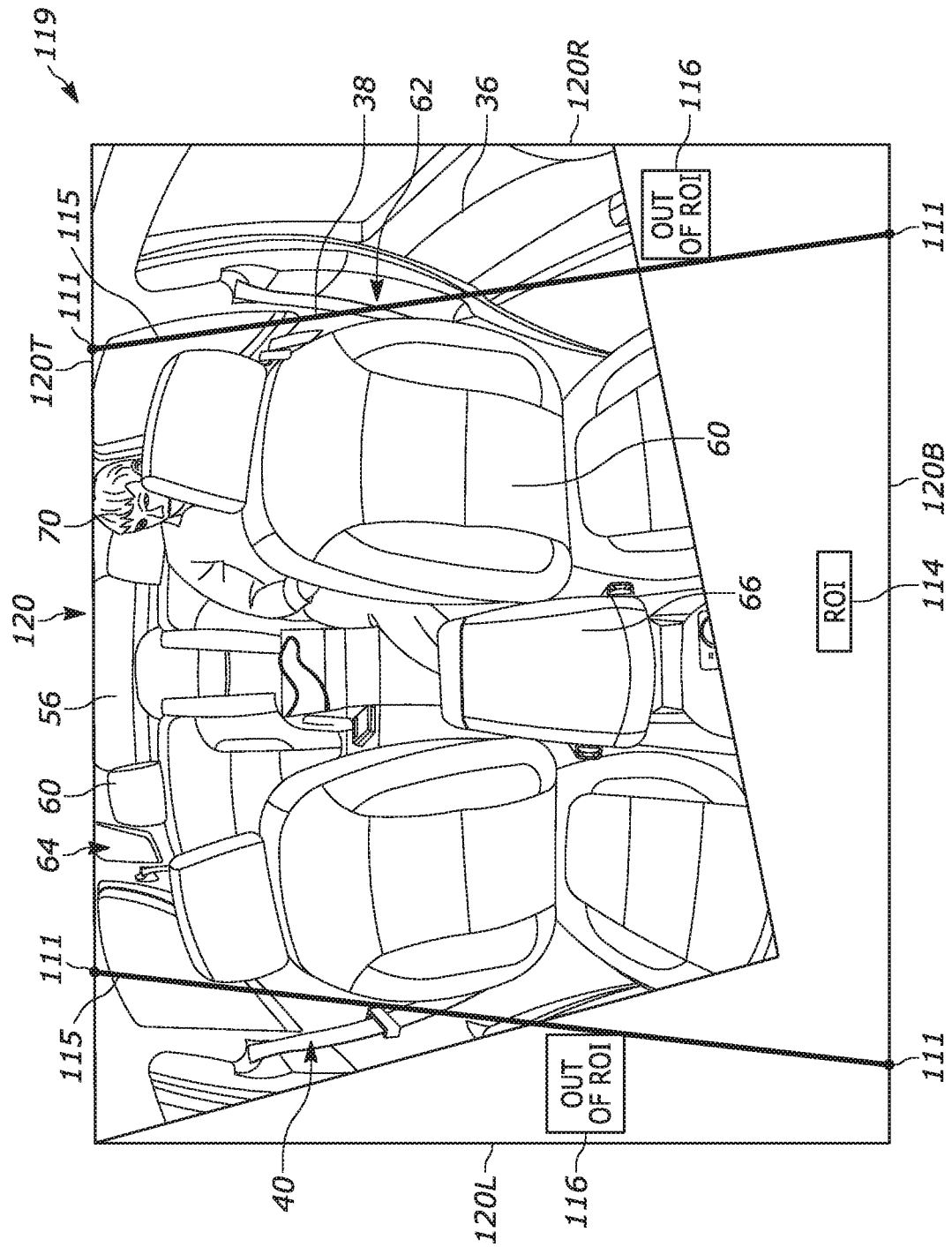
FIG. 5 is a schematic illustration of a calibrated live image with an ideally aligned region of interest.

To this end, calibrating the handful of bounding points 111 defining the region of interest 114 using the homography matrix is significantly easier, quicker, and more efficient than transforming or calibrating the entire live image 118 as was performed in FIG. 5. The region of interest 114 calibration ensures that any misalignment in the camera 90 from the ideal position will have minimal, if any, adverse effect on the accuracy in which the vision system 10 detects objects in the interior 40. The vision system 10 can perform the region of interest 114 calibration—each time generating a new homography matrix based on a new live image—at predetermined time intervals or occurrences, e.g., startup of the vehicle 20 or at five second intervals.

The calibrated region of interest 134 can be used to detect objects within the interior 40. The controller 100 analyzes the calibrated image 128 or calibrated region of interest 134 and determines what, if any, objects are located therein. In the example shown, the controller 100 detects occupants 70 within the calibrated region of interest 134. It will be appreciated, however, that the controller 100 can calibrate any alternative or additional regions of interest 114a-114c to form the associated calibrated region of interest and detect the particular object of interest therein (not shown).

The controller 100, when analyzing the calibrated image 128, may detect objects that intersect or cross outside the calibrated region of interest 134 and are therefore present both inside and out of the calibrated region of interest. When this occurs, the controller 100 can rely on a threshold percentage that determines whether the detected object is ignored. More specifically, the controller 100 can acknowledge or "pass" a detected object having at least, for example, 75% overlap with the calibrated region of interest 134. Consequently, a detected object having less than the threshold percentage overlap with the calibrated region of interest 134 will be ignored or "fail". Only detected objects that meet this criterion would be taken into consideration for further processing or action.

The vision system 10 can perform one or more operations in response to detecting and/or identifying objects within the calibrated live image 128. This can include, but is not limited to, deploying one or more airbags based on where occupant(s) are located in the interior 40 or alerting the driver when a pet or child is not in a normal position in the rear row 64 of seats 60, etc.

Figure 7:
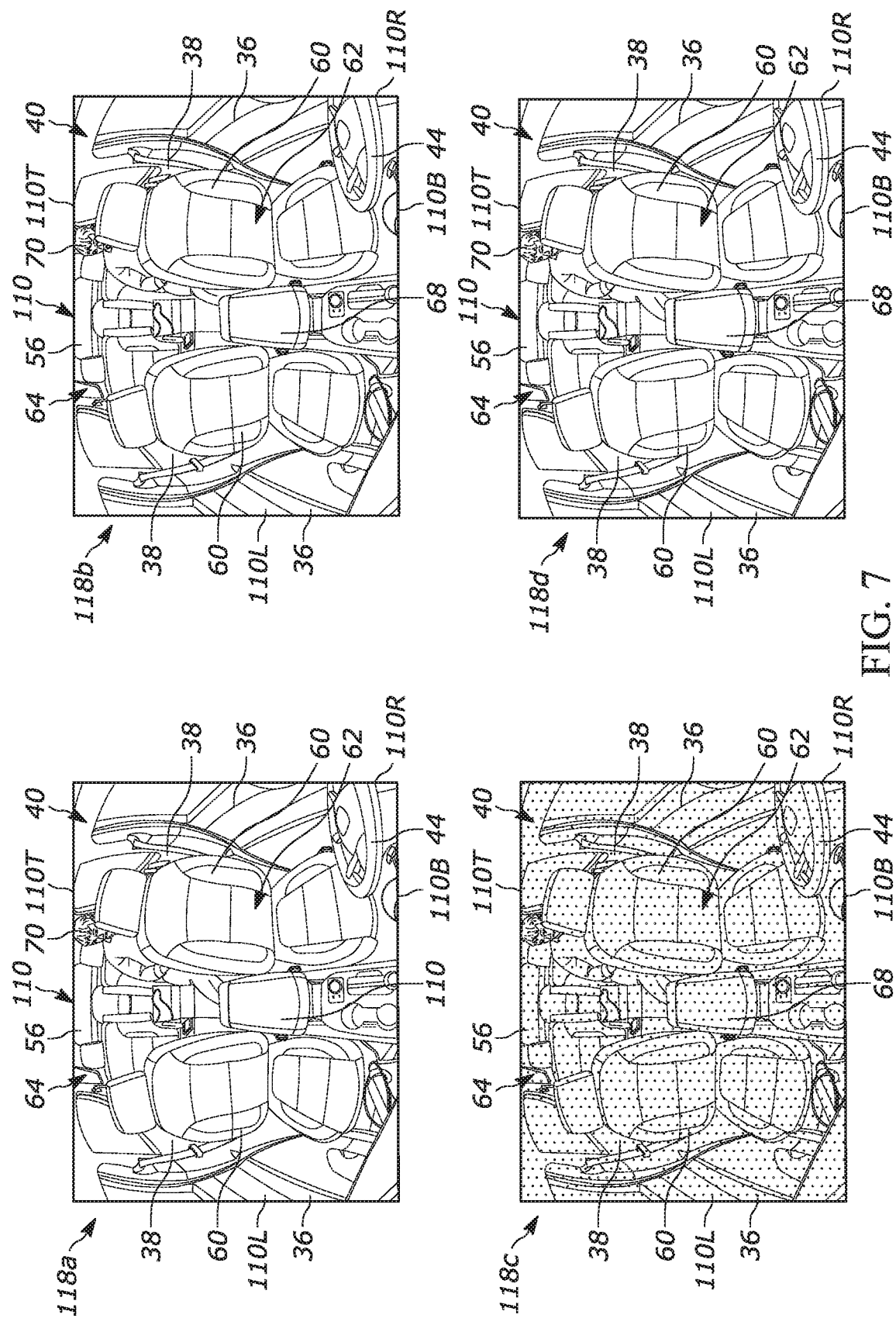
FIG. 7 is a schematic illustration of consecutive live images taken by the vision system.
Figure 8:
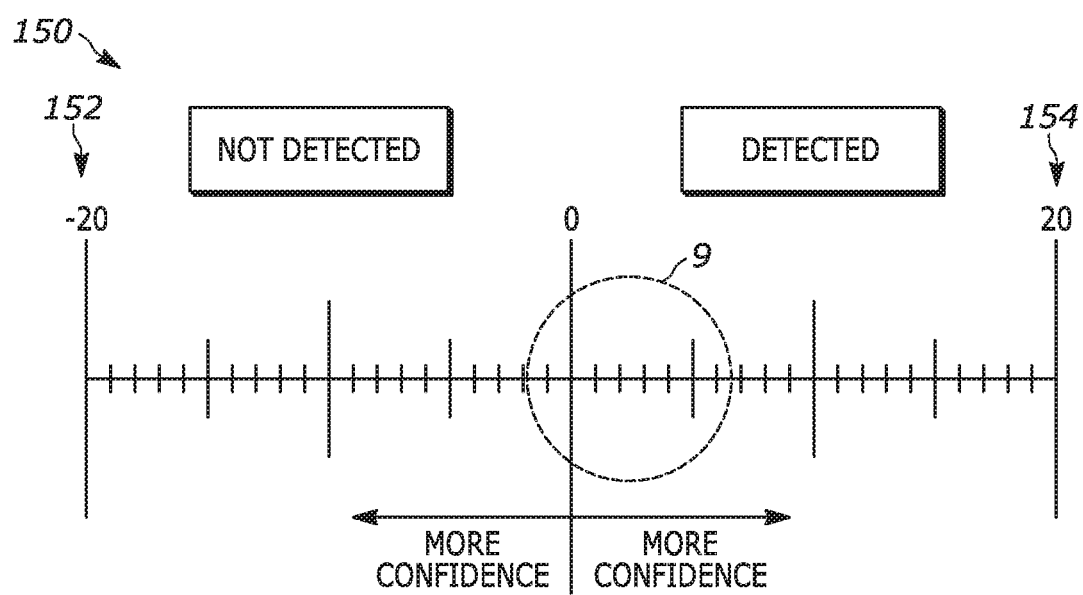
FIG. 8 is a schematic illustration of a confidence level used to evaluate the live images.
Figure 9:
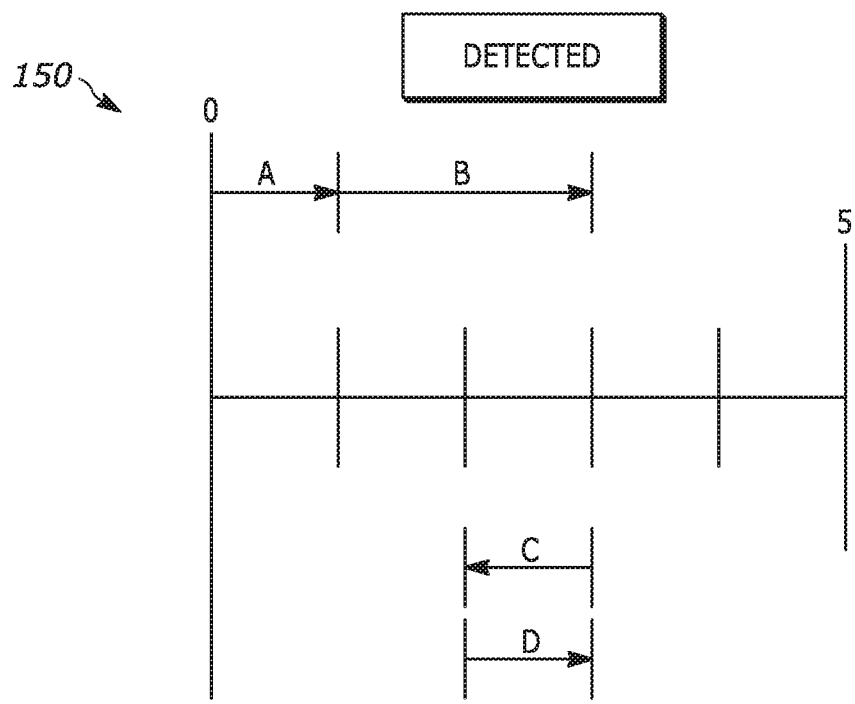
FIG. 9 is an enlarged view of a portion of the confidence level of FIG. 8.

Referring to FIGS. 7-9, the vision system 10 includes additional safeguards, including a confidence level in the form of a counter, for helping ensure that objects are accurately detected within the live images 118. The confidence level can be used in combination with the aforementioned calibration or separately therefrom. During operation of the vehicle 20, the camera 90 takes multiple live images 118 (see FIG. 7) in rapid succession, e.g., multiple images per second. Each live image 118 in succession is given an index, e.g., first, second, third, . . . up to the $n^{th}$ image and a corresponding suffix "a", "b", "c" . . . "n" for clarity. Consequently, the first live image is indicated at 118a in FIG. 7. The second live image is indicated at 118b. The third live image is indicated at 118c. The fourth live image is indicated at 118d. Although only four live images 118a-118d are shown it will be appreciated that the camera 90 can take more or fewer live images. Regardless, the controller 100 performs object detection in each live image 118.

With this in mind, the controller 100 evaluates the first live image 118a and uses image inference to determine what object(s)—in this example an occupant 70 in the rear row 64—is located within the first live image. The image inference software is configured such that an object won't be indicated as detected without at least a predetermined confidence level, e.g., at least 70% confidence an object is in the image.

It will be appreciated that this detection can occur following calibrating the first live image 118a (and subsequent live images) as described above or without calibration. In other words, object detection can occur in each live image 118 or specifically in the calibrated region of interest 134 projected onto the live image 118. The discussion that follows focuses on detecting the object/occupant 70 in the live images 118 without first calibrating the live images and without using a region of interest.

When the controller 100 detects one or more objects in a live image 118, a unique identification number and a confidence level 150 (see FIG. 8) in the are associated with or assigned to each detected object. Although multiple objects can be detected, in the example shown in FIGS. 7-9 only a single object—in this case the occupant 70—is detected and therefore only the single confidence level 150 associated therewith is shown and described for brevity. The confidence level 150 helps to assess the reliability of the object detection.

The confidence level 150 has a range between first and second values 152, 154, e.g., a range from −20 to 20. The first value 152 can act as a minimum value of the counter 150. The second value 154 can act as a maximum value of the counter 150. A confidence level 150 value of 0 indicates that no live images 118 have been evaluated or no determination can be made about the actual existence or lack thereof of the detected object in the live images 118. A positive value for the confidence level 150 indicates it is more likely than not that the detected object is actually present in the live images 118. A negative value for the confidence level 150 indicates it is more likely than not that the detected object is not actually present in the live images 118.

Furthermore, as the confidence level 150 decreases from a value of 0 towards the first value 152, the confidence that the detected object is not actually present in the live images 118 (a "false" indication) increases. On the other hand, as the confidence level 150 increases from 0 towards the second value 154, the confidence that the detected object is actually present in the live images 118 (a "true" indication) increases.

Before the first live image 118a is evaluated the confidence level 150 has a value of 0 (see also FIG. 9). If the controller 100 detects the occupant 70 within the first live image 118a the value of the confidence level 150 increases to 1. This increase is shown schematically by the arrow A in FIG. 9. Alternatively, detecting an object in the first live image 118a can keep the confidence level 150 at a value of 0 but trigger or initiate the multi-image evaluation process.

For each subsequent live image 118b-118d, the controller 100 detects whether the occupant 70 is present or not present. The confidence level 150 will increase in value (move closer to the second value 154) when the controller 100 detects the occupant 70 in each of the live images 118b-118d. The confidence level 150 will decrease in value (move closer to the first value 152) each time the controller 100 does not detect the occupant 70 in one of the live images 118b-118d.

The amount the confidence level 150 increases or decreases for each successive live image can be the same. For example, if the occupant 70 is detected in five consecutive live images 118, the confidence level 150 can increase as follows: 0, 1, 2, 3, 4, 5. Alternatively, the confidence level 150 can increase in a non-linear manner as the consecutive number of live images in which the occupant 70 is detected increases. In this instance, the confidence level 150 can increase as follows: 0, 1, 3, 6, 10, 15 after each live image 118 detection of the occupant 70. In other words, the reliability or confidence in the object detection assessment can increase rapidly as the object is detected in more consecutive images.

Similarly, if the occupant 70 is not detected in five consecutive live images 118, the confidence level 150 can decrease as follows: 0, −1, −2, −3, −4, −5. Alternatively, if the occupant 70 is not detected in five consecutive live images 118, the confidence level 150 can decrease in a non-linear manner as follows: 0, −1, −3, −6, −10, −15. In other words, the reliability or confidence in the object detection assessment can decrease rapidly as the object is not detected in more consecutive images. In all cases, the confidence level 150 adjusts, i.e., increases or decreases, as each successive live image 118 is evaluated for object detection. It will be appreciated that this process is repeated for each confidence level 150 associated with each detected object and, thus, each detected object will undergo the same object detection evaluation.

It will also be appreciated that once the counter 150 reaches the minimum value 152 any subsequent non-detection will not change the value of the counter from the minimum value. Similarly, once the counter 150 reaches the maximum value 154 any subsequent detection will not change the value of the counter from the maximum value.

With the example shown, after detecting the occupant 70 in the first live image 118a, the controller then detects the occupant in the second live image 118b, does not detect the occupant in the third live image 118c, and detects the occupant in the fourth live image 118d. The lack of detection in the third live image 118c can be attributed to lighting changes, rapid motion of the occupant 70, etc. As shown, the third live image 118c is darkened by lighting conditions in/around the vehicle 20, rendering the controller 100 unable to detect the occupant 70. That said, the confidence level 150 increases in value by 2 in the manner indicated by the arrow B in response to the occupant 70 detection in the second live image 118b.

The confidence level 150 then decreases in value by 1 in the manner indicated by the arrow C in response to no detection of the occupant 70 in the third live image 118c. The confidence level 150 then increases in value by 1 in the manner indicated by the arrow D in response to the occupant 70 detection in the fourth live image 118d. The final confidence level 150 has a value of 3 following evaluation of all the live images 118a-118d for object detection.

The final value of the confidence level 150 between the first and second values 152, 154 can indicate when the controller 100 ascertains the detected occupant 70 is in fact present and the degree of confidence in that determination. The final value of the confidence level 150 can also indicate when the controller 100 ascertains the detected occupant 70 is not in fact present and the degree of confidence in that determination. The controller 100 can be configured to make the final determination of whether a detected occupant 70 is actually present or not after evaluating a predetermined number of consecutive live images 118 (in this case four) or after a predetermined time frame, e.g., seconds or minutes, of acquiring live images.

The positive value of the confidence level 150 after examining the four live images 118a-118d indicates it is more likely than not that the occupant 70 is in fact present in the vehicle 20. The value of the final confidence level 150 indicates the assessment is less confident than a final value nearer the second value 154 but more confident than a final value closer to 0. The controller 100 can be configured to associate specific percentages or values to each final confidence level 150 value or range of values between and including the values 152, 154.

The controller 100 can be configured to enable, disable, actuate and/or deactivate one or more vehicle functions in response to the value of the final confidence level 150. This can include, for example, controlling vehicle airbags, seatbelt pre-tensioners, door locks, emergency braking, HVAC, etc. It will be appreciated that different vehicle functions may be associated with different final confidence level 150 values. For instance, vehicle functions associated with occupant safety may require a relatively higher final confidence level 150 value to initiate actuation than a vehicle function unrelated to occupant safety. To this end, object detection evaluations with a final confidence level 150 value of 0 or below can be completely discarded or ignored in some situations.

Evaluation of the live images 118 can be conducted multiple times or periodically during operation of the vehicle 20. The evaluation can be performed within the vehicle interior 40 when the field of view 92 of the camera 90 faces inward or around the vehicle exterior 41 when the field of view faces outward. In each case, the controller 100 examines multiple live images 118 individually for object detection and makes a final determination with an associated confidence value that the detected object is or is not actually present in the live images.

The vision system shown and described herein is advantageous in that it provides increased reliability in object detection in and around the vehicle. When multiple images of the same field of view within a short timeframe are taken, the quality of one or more images can be affected by, for example, lighting conditions, shadows, objects passing in front of and obstructing the camera and/or motion blurring. Consequently, current cameras may produce false positive and/or false negative detections of objects in the field of view. This false information can have adverse effects in downstream applications that rely on object detection.

By analyzing a series of consecutive live images individually to determine a cumulative confidence score, the vision system of the present invention helps alleviate the aforementioned deficiencies that may exist in a single frame. The vision system shown and described herein therefore helps reduce false positives and false negatives in object detection.

That said, the controller 100 can not only detect an object within the vehicle 20 but classify the detected object. At a first stage of classification, the controller 100 determines whether the detected object is a human or an animal/pet. In the former case, a second classification is made identifying the detected human as an adult, a child or an infant. If a child, infant or pet is detected, the controller 100 can perform one or more desirable vehicle functions.

Figure 10:
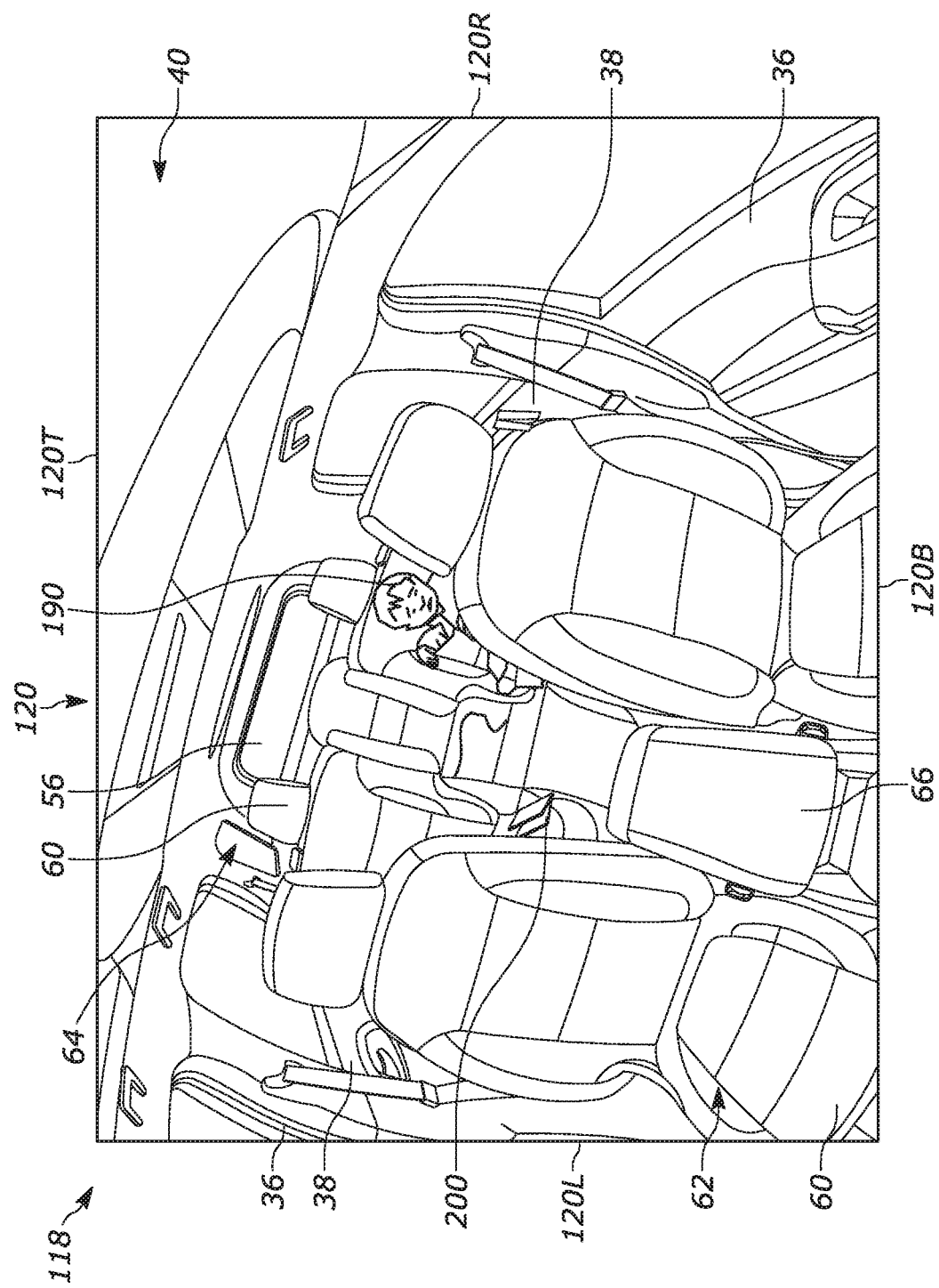
FIG. 10 is a schematic illustration of a child in the vehicle interior.
Figure 11:
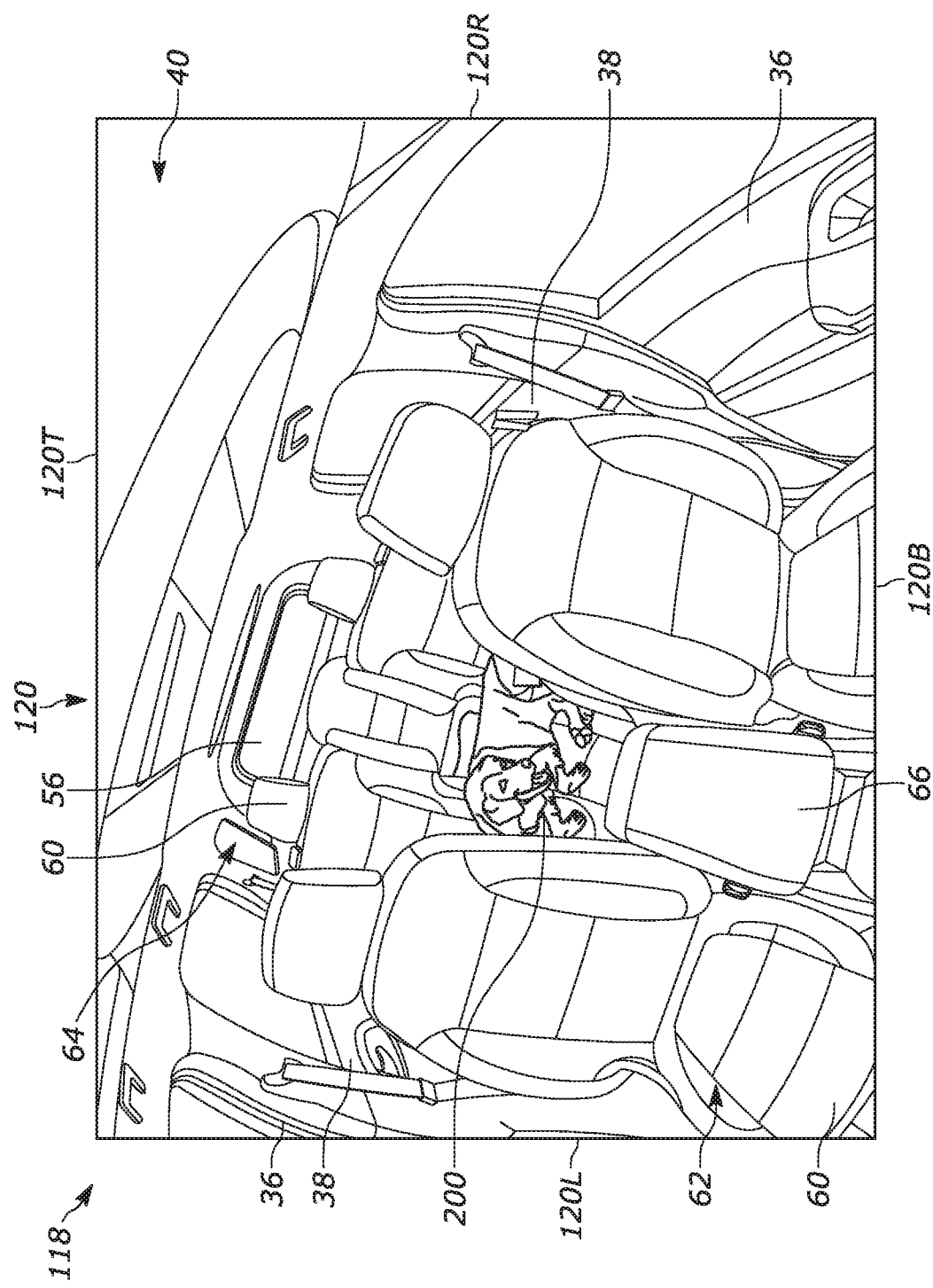
FIG. 11 is a schematic illustration of a pet in the vehicle interior.

In an example shown in FIG. 10, the controller 100 detects and identifies a child 190 in the vehicle interior 40, e.g., in a seat 60 in the rear row 64. In an example shown in FIG. 11, the controller 100 detects and identifies a pet 200 in the seat 60 in the rear row 64. In each case, the detection can be made with or without calibrating the live image 118 or region of interest 114 associated with the ideally aligned image 108. The detection can also be performed with or without utilizing the confidence level/counter 150. In any case, the process described occurs after either the child 190 or pet 200 is detected.

Once the child 190 or pet 200 is detected, the controller 100 determines whether the child or pet is alone/unaccompanied by an adult in the vehicle 20, i.e., left unattended in the interior 40. To this end, the controller 100 can determine whether any other occupants 70 were detected within the interior 40. The controller 100, in response to determining that the child 190 or pet 200 is alone, can initiate one or more vehicle functions. This can include, for example, contacting individuals located away from the vehicle 20, checking and adjusting the safety of the vehicle 20, and/or controlling the climate inside the vehicle.

Figure 12:
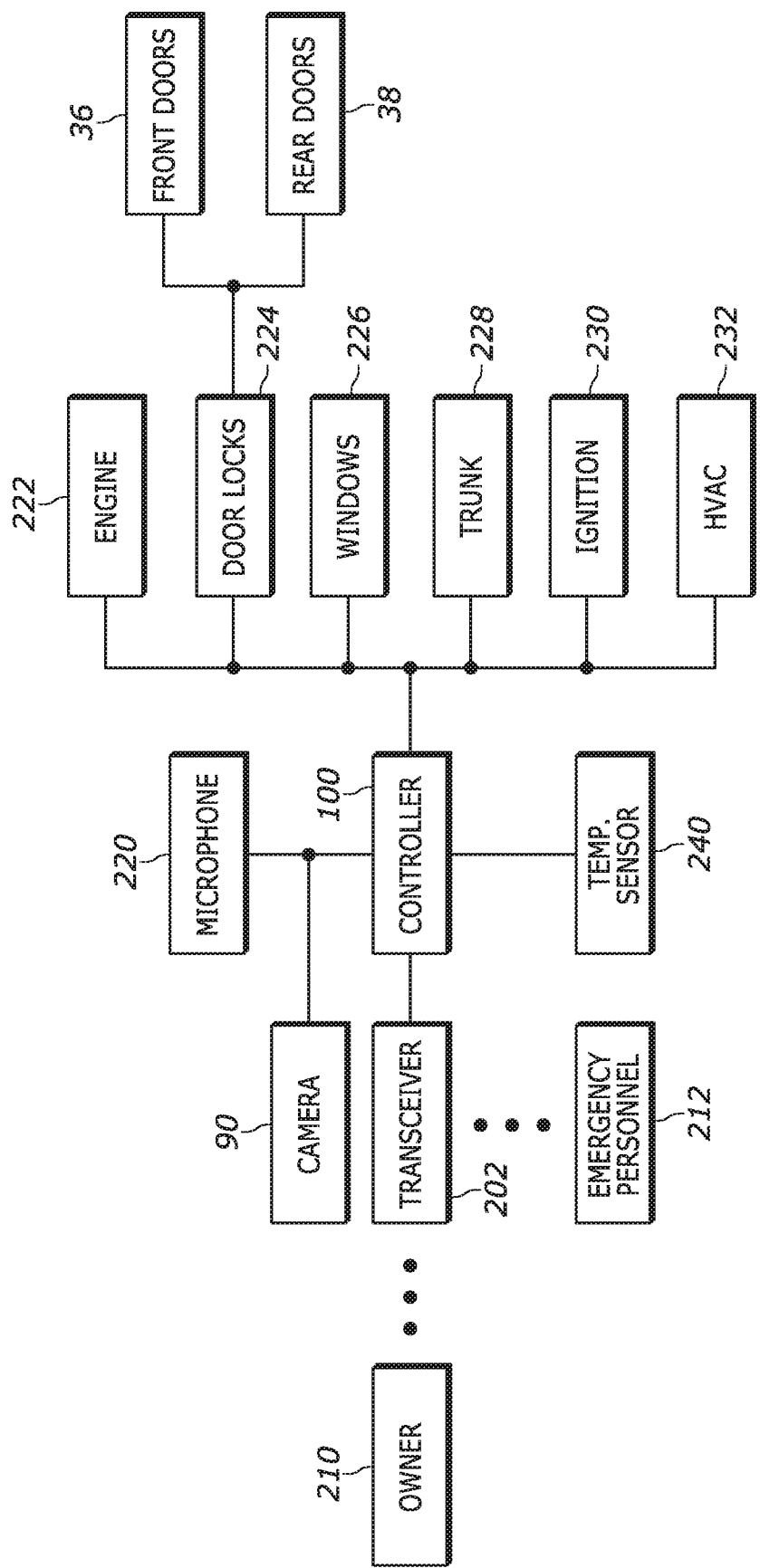
FIG. 12 is a schematic illustration of a controller connected to vehicle components.

To this end, and referring to FIG. 12, the controller 100 can be connected to a transceiver 202 for sending alert signals to one or more recipients located away from the vehicle. The recipients can include the owner 210 of the vehicle 20, a predetermined list of people provided by the owner to the controller 100, and/or emergency personnel 212. The alert signals can be received by, for example, a mobile device or computer accessible to and/or carried by the owner 210 or emergency personnel 212. The controller 100 can therefore use the transceiver 202 to alert the owner 210 that an unattended child 190 or pet 200 is in the vehicle 20. If the owner 210 does not respond within a predetermined period of time, the controller 100 can also send the alert to the emergency personnel 212.

In the case of notifying the owner 210, the alert can include, for example, images and/or video of the vehicle interior 40 captured by the camera 90. In the case of the emergency personnel 212, the alert can be part of an information packet that can also include, for example, a visual description of the vehicle 20, e.g., make and model, license plate information, GPS location information, etc. for helping the emergency personnel locate and identify the vehicle in which the child 190 or pet 200 is alone.

The controller 100 can also be connected to one or more microphones 220 (see also FIGS. 1A-1B) for acquiring audio within the interior 40. The microphone 220 can be used to detect distressed, living objects within the vehicle 20, such as the child 190 or pet 200. More specifically, the microphone 220 can capture yelling, crying, etc. indicative of a distressed child 190 and/or barking, meowing, whimpering, etc., indicative of a distressed pet 200. The controller 100 can receive and analyze the sounds acquired by the microphone 220 and determine whether or not a distressed child 190 or pet 200 is in the interior 40. The alert can therefore include text indicating the unaccompanied child 190 or pet 200 is distressed.

It will be appreciated that the distressed-related alerts can be sent in combination with or in the absence of visual-related alerts. In other words, the owner 210 or emergency personnel 212 can be notified of a distressed infant, child or pet in the vehicle 20 without receiving additional information. The mobile device of the owner 210 can be configured to only receive distressed-related alerts when spaced a predetermined distance from the vehicle 20 to avoid receiving alerts while in the vehicle with the distressed infant, child or pet.

The controller 100 can also be connected to multiple safety-related features of the vehicle 20. The controller 100 can check these features in response to determining the child 190 or pet 200 is alone. For example, the controller 100 can be connected to the engine 222, and locks 224 associated with the front and rear doors 36, 38. The controller 100 can also be connected to windows 226 along the sides 28, 30 of the vehicle 20 and the trunk 228 at the rear end 26. The controller 100 can also be connected to a climate control system, e.g., an HVAC system 232.

The controller 100 can perform several safety-related checks after determining an unattended child 190 or pet 200 is in the vehicle 20 and notifying the owner 210. More specifically, the controller 100 can determine whether the engine 222 is on, if any of the doors 36, 38 are unlocked, if any of the windows 226 are down, if the trunk 228 is open, and if the keys are in the ignition 230. In response, the controller 100 can lock the door locks 224, roll up the windows 226, and/or lock the trunk 228, if needed, to help increase the safety of the vehicle 20 while the child 190 or pet 200 is alone.

Furthermore, if the engine 222 is off, the controller 100 can turn on both the engine 222 and HVAC system 232 to help control the climate in the interior 40 until the owner 210 or emergency personnel 212 can reach the unattended child 190 or pet 200. The controller 100 can be connected to a temperature sensor 240 exposed to the interior for helping monitor the interior 40 temperature. The temperature sensor 240 sends signals to the controller 100 indicative of the temperature within the interior 40. If the detected temperature within the interior 40 meets or exceeds a predetermined value, the controller 100 can take measures to reduce the interior temperature, e.g., lower one or more of the windows 226 to increase airflow or actuate the HVAC system 232. Similarly, if the detected temperature within the interior 40 is at or below a second predetermined value, the controller 100 can actuate the HVAC system 232 to raise the interior 40 temperature. The HVAC system 232 can therefore be actuated when the temperature within the interior 40 is outside a predetermined range—too hot or too cold.

The process shown and described for identifying infants, children and/or pets left alone in a vehicle is advantageous in that it provides notification to the owner and emergency personnel while ensuring the vehicle is locked until the owner or emergency personnel arrives. The process is also advantageous in that it both monitors and regulates the temperature of the vehicle interior while the infant, child or pet is alone.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A method of processing live images from a vehicle camera, comprising:
   acquiring live images from an interior of the vehicle;
   detecting an object within a first live image of the live images;
   evaluating the live images following the first live image for object detection;
   adjusting a confidence level in response to the object detection evaluation in each of the live images following the first live image;
   establishing a final value of the confidence level in the object detection within the live images after the live images are evaluated;
   determining if the detected object is present in the vehicle interior based on the confidence level; and
   determining if the detected object is alone in the vehicle.

2. The method of claim 1 further comprising increasing the confidence level in response to detecting the object in the first live image.

3. The method of claim 1, wherein the step of adjusting the confidence level comprises at least one of:
   increasing the confidence level each time the object is detected in any of the live images following the first live image; and
   decreasing the confidence level each time the object is not detected in any of the live images following the first live image.

4. The method of claim 1, wherein the confidence level increases the same amount for each consecutive image of the live images in which the object is detected.

5. The method of claim 1, wherein the confidence level increases a non-linear amount for each consecutive image of the live images in which the object is detected.

6. The method of claim 1, wherein the confidence level decreases the same amount for each consecutive image of the live images in which the object is not detected.

7. The method of claim 1, wherein the confidence level decreases a non-linear amount for each consecutive image of the live images in which the object is not detected.

8. The method of claim 1, wherein the step of acquiring the live images comprises acquiring a predetermined number of live images.

9. The method of claim 1, wherein the step of acquiring the live images comprises acquiring live images for a predetermined amount of time.

10. The method of claim 1, further comprising classifying the detected object as one of an infant, a child, and a pet.

11. The method of claim 10 further comprising notifying an owner of the vehicle that the detected object is alone in the vehicle.

12. The method of claim 11 further comprising notifying emergency personnel that the detected object is alone in the vehicle if the notified owner does not respond.

13. The method of claim 10 further comprising notifying emergency personnel that the detected object is alone in the vehicle.

14. The method of claim 10 further comprising:
   monitoring a temperature in the vehicle; and
   actuating a climate control system of the vehicle when the temperature of the vehicle interior is outside a predetermined range.

15. The method of claim 14 further comprising turning on an engine of the vehicle prior to actuating the climate control system.

16. The method of claim 10 further comprising:
   monitoring a temperature in the vehicle; and
   rolling down at least one window of the vehicle when the temperature in the vehicle interior meets or exceeds a predetermined value.

17. The method of claim 10 further comprising:
   determining the detected object is distressed based on sound in the vehicle; and
   notifying an owner of the vehicle that the detected object is distressed.

18. A method of processing live images from a vehicle camera, comprising:
   acquiring live images of an interior of the vehicle;

calibrating the live images, including the steps of:
   comparing the live images to an ideally aligned image of the vehicle interior having a region of interest to generate a homography matrix; and
   applying the homography matrix to the region of interest to generate a calibrated region of interest projected onto each of the live images for detecting an object therein;
detecting an object within the calibrated region of interest in a first live image of the live images;
evaluating the live images following the first live image for object detection;
adjusting a confidence level in response to the object detection evaluation in each of the live images following the first live image; and
establishing a final value of the confidence level in the object detection within the live images after the live images are evaluated.

19. A method of processing live images from a vehicle camera, comprising:
   acquiring live images of an interior of the vehicle;
   comparing the live images to an ideally aligned image of the vehicle interior having a region of interest to generate a homography matrix;
   applying the homography matrix to the region of interest to generate a calibrated region of interest projected onto each of the live images;
   detecting at least one object within the calibrated region of interest in a first live image of the live images;
   evaluating the calibrated region of interest in the live images following the first live image for object detection, each of the at least one detected objects having a confidence level associated therewith, each confidence level being increased each time the associated object is detected in any of the live images following the first live image and being decreased each time the associated object is not detected in any of the live images following the first live image; and
   establishing a final value of the confidence level in the object detection within the live images for each detected object after the live images are evaluated.

20. The method of claim 19, wherein the confidence level increases the same amount for each consecutive image of the live images in which the object is detected.

21. The method of claim 19, wherein the confidence level increases a non-linear amount for each consecutive image of the live images in which the object is detected.

22. The method of claim 19, wherein the confidence level decreases the same amount for each consecutive image of the live images in which the object is not detected.

23. The method of claim 19, wherein the confidence level decreases a non-linear amount for each consecutive image of the live images in which the object is not detected.

24. The method of claim 19 further comprising:
   determining the detected object is present in an interior of the vehicle based on the confidence level; and
   determining the detected object is alone in the vehicle.

25. The method of claim 24, further comprising classifying the detected object as one of an infant, a child, and a pet.

26. The method of claim 25 further comprising notifying an owner of the vehicle that the detected object is alone in the vehicle.

27. The method of claim 26 further comprising notifying emergency personnel that the detected object is alone in the vehicle if the notified owner does not respond.

28. The method of claim 25 further comprising:
   monitoring a temperature in the vehicle; and
   actuating a climate control system of the vehicle when the temperature of the vehicle interior is outside a predetermined range.

29. The method of claim 28 further comprising turning on an engine of the vehicle prior to actuating the climate control system.

30. The method of claim 25 further comprising:
   monitoring a temperature in the vehicle; and
   rolling down at least one window of the vehicle when the temperature in the vehicle interior meets or exceeds a predetermined value.

31. The method of claim 25 further comprising:
   determining the detected object is distressed based on sound in the vehicle; and
   notifying an owner of the vehicle that the detected object is distressed.

* * * * *